United States Patent
Leung et al.

(10) Patent No.: US 6,756,925 B1
(45) Date of Patent: Jun. 29, 2004

(54) PSK RSFQ OUTPUT INTERFACE

(75) Inventors: Michael Leung, Lomita, CA (US); Adrian Guoping Sun, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/418,841

(22) Filed: Apr. 18, 2003

(51) Int. Cl.[7] .................................................. H03M 1/00
(52) U.S. Cl. ...................... 341/133; 341/155; 375/376; 713/400; 331/11; 331/12
(58) Field of Search .................................. 341/133, 155; 375/376; 713/400; 331/11, 12, 14, 25

(56) References Cited

U.S. PATENT DOCUMENTS

| | | | | |
|---|---|---|---|---|
| 4,551,845 A | * | 11/1985 | ab der Halden et al. | .... 375/267 |
| 4,962,380 A | * | 10/1990 | Meadows | .................. 341/120 |
| 5,319,369 A | * | 6/1994 | Majos et al. | ................. 341/101 |
| 5,818,373 A | | 10/1998 | Semenov et al. | |
| 5,942,997 A | | 8/1999 | Silver et al. | |
| 5,982,807 A | | 11/1999 | Snell | |
| 6,094,627 A | * | 7/2000 | Peck et al. | ................... 341/155 |
| 6,365,329 B2 | * | 4/2002 | Kerfeld | ....................... 430/321 |
| 6,374,360 B1 | * | 4/2002 | Keeth et al. | ................ 713/400 |
| 6,509,853 B2 | * | 1/2003 | Gupta | ......................... 341/133 |
| 6,608,581 B1 | * | 8/2003 | Semenov | ..................... 341/155 |
| 6,662,304 B2 | * | 12/2003 | Keeth et al. | ................ 713/400 |

* cited by examiner

*Primary Examiner*—Michael Tokar
*Assistant Examiner*—Lam T. Mai
(74) *Attorney, Agent, or Firm*—Tarolli, Sundheim, Covell & Tummino L.L.P.

(57) ABSTRACT

A Rapid Single-Flux-Quantum ("RSFQ") encoder output interface device is provided. The RSFQ output interface device includes a variable phase multi-junction voltage controlled oscillator (VCO) that provides multiple clock signals having similar frequencies based on a DC bias current setting. The multiple clock signals are phase shifted from one other based on a flux bias current setting. The clock signals are then mixed together according to logic states of a data stream to provide an encoded output data stream. The encoded output data stream can be in a phase shifted keying (PSK) format. The PSK format can be provided in binary, quadrature or other PSK formats. The Single-Flux-Quantum (SFQ) voltage pulses of the encoded output data stream are converted to a voltage level appropriate for transmitting over a wire.

25 Claims, 8 Drawing Sheets

US 6,756,925 B1

PSK RSFQ OUTPUT INTERFACE

TECHNICAL FIELD

The present invention relates generally to circuit devices, and more particularly to a superconducting encoder output interface device.

BACKGROUND OF THE INVENTION

There is an ever increasing demand for faster digital circuits. Traditional semiconductor electronic devices have been unable to adequately provide the desired speed for transmitting signals from high speed digital interface devices operating in frequencies above the gigahertz range (e.g., microwave frequencies). For example, conventional semiconductor technologies can handle multi-gigabit frequencies only if broad parallel circuits are utilized between interface devices. The broad parallel circuits consume unacceptable power levels in addition to increasing the complexity of the devices due to the serial-to-parallel conversions required, and the multiple line connections between units. A recent alternative to traditional semiconductor devices is superconductor electronics. Superconductor electronics provide logic devices that can achieve very high clock frequencies in the order of hundreds of gigahertz.

A library of Rapid Single-Flux-Quantum ("RSFQ") devices have been developed over the past few years in order to provide ultrafast processing at low power consumption. RSFQ devices store and process digital bits in the form of single quanta of magnetic flux $\phi_0$ transferring them in the form of short Single-Flux-Quantum ("SFQ") pulses V(t), for example, having a quantized area $\int V(t)dt \approx 2$ mV·pS. This data representation allows RSFQ logic to achieve extremely high clock frequencies. Due to their ability to provide ultrafast processing at low power consumption, the use of RSFQ circuits in digital systems has become increasingly desirable.

However, RSFQ circuits have a much lower signal level (e.g., about 0.5 mV to about 2.0 mV) compared to conventional semiconductor devices. For example, a simple SFQ/DC converter will convert a Return-to-Zero ("RZ") SFQ signal into an output dc voltage. The signal will then need to be amplified by several orders of magnitude before it can be transmitted over a transmission line to non-superconducting devices. A significant problem with such signal amplification lies in the fact that the output voltage signal may become contaminated by a non-zero DC component that introduces noise into the transmitted signal that can overcome or swamp the desired signal. One approach to providing a clean output signal lies in the use of encoding the signal to mitigate the amplification of the non-zero DC component prior to amplification. Phase-Shift-Keying ("PSK") or Manchester coding is one alternative to the encoding of a signal prior to amplification. The main attraction of PSK coding lies in the fact that while it contains a strong timing component, PSK coding contains a zero DC spectral component. In PSK coded data, data representing a digital one is transmitted at one particular phase, while data representing a digital zero is transmitted at another particular phase. Additionally, the encoded data signal then needs to be mixed with a high speed clock via a mixer, so that the data signal can be transmitted over the transmission line at very high speeds (e.g., several hundred megabits/sec).

Methods to introduce phase shifts for digital encoding prior to signal transmission are not flexible. Present methods to change data rates and phase delays are cumbersome. Encoding requires the ability to control the delay of a clock signal. For example, some of these methods require tuning the clock frequency and/or fixing the delay line length. Fixed-length delay lines on the other hand, have a restricted range of data rate. One mechanism to employ phase shifting for digital decoding is to run a clock through a phase shifter. The phase shifter generates the I component (in-phase) and Q component (quadrature phase) of the signal and employs a multiplexer to toggle between the phases. The phase shifter is limited in both the frequency bandwidth and the phase shift since the device is designed to provide a fixed frequency band and a fixed phase shift. Additionally, the phase shifter can be quite large, in the order of centimeters in size, and the size of the phase shifter increases with the lowering of the frequency. Furthermore, some phase shifters employ magnetic materials, which affect the performance of superconducting circuits, and therefore, phase shifters are not readily integrated with superconductor devices, thus limiting the speed of the transmission. Another conventional method can include employing a counter or clock through a coaxial cable or transmission line at different lengths to introduce a phase shift prior to transmission. Additionally, this method has limitations since the fixed coaxial cable or transmission line lengths are designed to provide a fixed frequency bandwidth and fixed phase shift.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

A Rapid Single-Flux-Quantum (RSFQ) encoder output interface device is provided. The RSFQ output interface device includes a RSFQ variable phase multi-junction voltage controlled oscillator (VCO) that provides multiple clock signals having substantially equal frequencies and variable phase delays, such that the clock function and the phase delay are integrated into a single device. The clock output signals generate Single-Flux-Quantum (SFQ) voltage pulses. The frequency of the multiple clock signals are based on a DC bias current setting. The multiple clock signals are phase shifted from one another based on a flux bias current setting. A fixed DC bias current source can be employed to provide a fixed clock signal frequency. Alternatively, a variable DC bias current source can be employed to provide a variable clock signal frequency. A fixed flux bias current source can be employed to provide a fixed phase delay between clock signals, and a variable flux bias current source can be employed to provide a variable phase delay between clock signals. The fixed current sources can be set to provide data encoded output in Phase-Shift-Keying (PSK) coding format, such as binary PSK (BPSK) or quadrature PSK (QPSK). The variable current source can be employed to provide a variable encoded format based on an encoded scheme profile.

The clock signals are then mixed together according to logic states of a data stream to provide an encoded output data stream. The clock signal can be mixed together employing a multiplexer with opposing phases being provided as input to the multiplexer and the data stream being coupled to the select line of the multiplexer. The multiplexer can also be a RSFQ device that is readily compatible with the RSFQ variable phase multi-junction VCO. The SFQ voltage pulses of the encoded output data stream are converted to a voltage level appropriate for transmitting over a wire. The RSFQ encoder output interface device is well suited for integrating into a high speed network routing system, such that a RSFQ encoder output interface can be provided at each respective output of a RSFQ router device.

In one aspect of the present invention, the RSFQ variable phase multi-junction VCO is comprised of M-1 adjacent Super Conducting Quantum Interface Device (SQUID) quantizers where M is the number of output terminals or stages of the RSFQ variable phase multi-junction VCO. The SQUID quantizers each have at least one inductor disposed between a pair of Josephson junctions with adjacent SQUID quantizers sharing adjacent Josephson junctions. A DC bias current source is coupled between each of the at least one inductors associated with a respective SQUID quantizer. The DC bias current sources provide DC bias currents that cause each of the Josephson junctions to oscillate and generate a series of SFQ voltage pulses at substantially equal frequencies.

A flux bias current source is electrically coupled to a plurality of inductors that are magnetically coupled to the inductors associated with the SQUID quantizers to induce circulating currents into the SQUID quantizers that cause phase shifts between the series of SFQ voltage pulses at each output terminal of the RSFQ variable phase multi-junction VCO. The phase shifts of the associated output terminals can be equal to 360°/M where M is an integer and a power of 2 (e.g., 4, 8, 16, 32, etc.). However, it is to be appreciated that other variations of phase shifts per stage can be employed. The phase shifted clock output signals are provided to M/2 multiplexers where each multiplexer receives a first and second phase shifted SFQ voltage pulse of opposing phases. The outputs of the multiplexers are then provided to a summer to generate a single encoded output having a MPSK coding format.

In another aspect of the present invention, a method for transmitting data in an encoded format is provided employing the RSFQ variable phase multi-junction VCO. The method includes setting a carrier frequency and a phase delay for a plurality of SFQ voltage pulse clock output signals. The plurality of phase delayed SFQ voltage pulse clock output signals are then selected for transmission based on logic states of an input data stream to provide an SFQ encoded data stream. The SFQ encoded data stream is then converted to an output voltage level appropriate for transmission over a wire and the noise filtered from the converted encoded data stream. The encoded data stream is then transmitted to a user over a wire. The encoded data can be in a PSK coded format, or in a variable encoded format.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF INVENTION

The present invention relates to a Rapid Single-Flux-Quantum ("RSFQ") encoder output interface device. The RSFQ output interface device includes a variable phase multi-junction voltage controlled oscillator (VCO) that provides multiple clock signals having substantial equal frequencies based on a DC bias current setting. The multiple clock signals are phase shifted from one another based on a flux bias current setting. The clock signals are then mixed together (e.g., via a multiplexer) according to logic states of a data stream to provide an encoded output data stream. The encoded output data stream can be in a phase shifted keying (PSK) format. The PSK format can be provided in binary, quadrature or other PSK formats. The Single-Flux-Quantum (SFQ) voltage pulses of the encoded output data stream are converted to a voltage level appropriate for transmitting over a wire.

Figure 1:
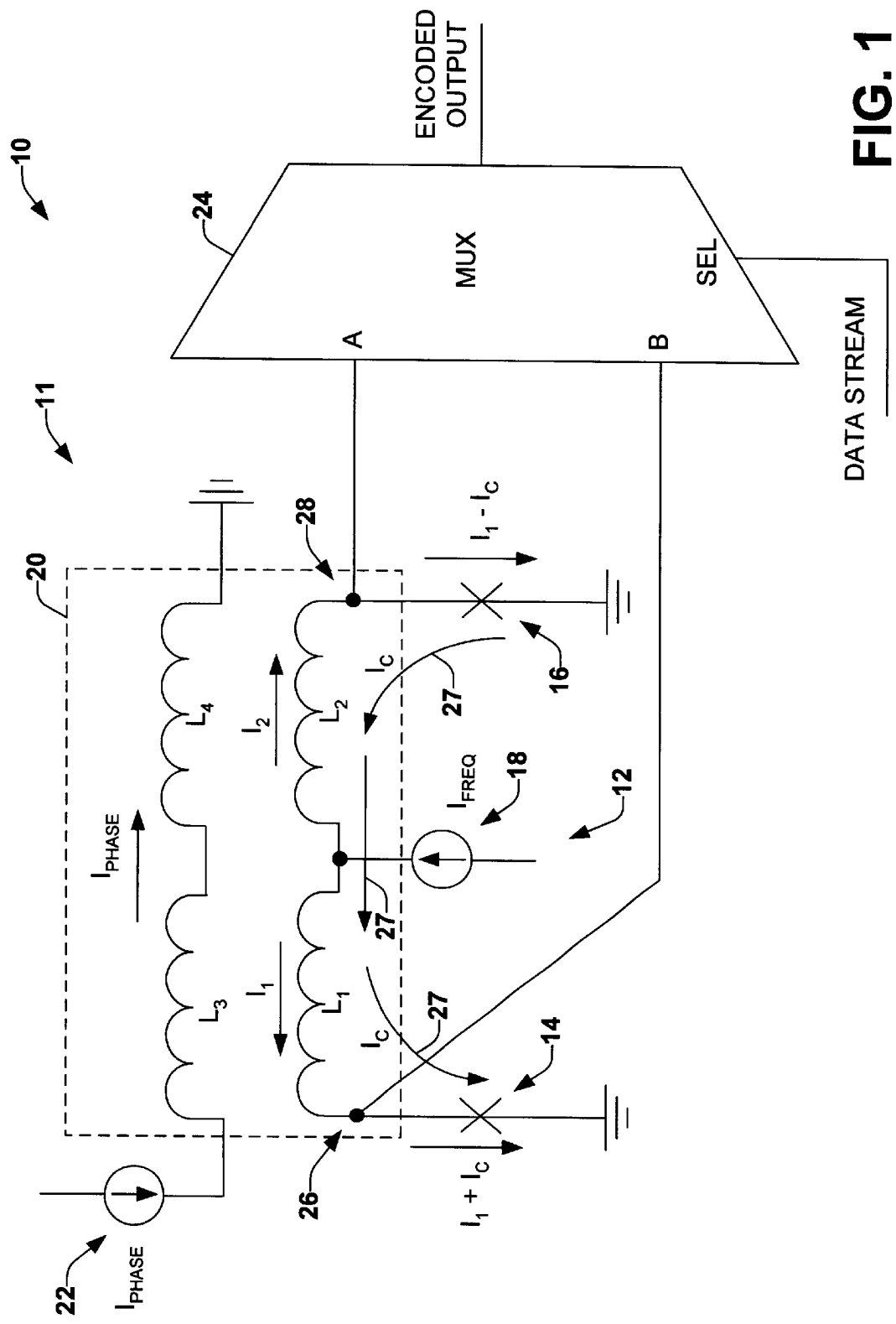
FIG. 1 illustrates a schematic diagram of a PSK RSFQ output interface device in accordance with an aspect of the present invention.

FIG. 1 illustrates a schematic diagram of a PSK RSFQ output interface 10 in accordance with an aspect of the present invention. The output interface 10 receives a data stream at a first frequency, and provides an encoded version (e.g., binary phase shift key (BPSK) coding) of the data stream at a substantially higher carrier frequency. The output interface 10 provides the encoded version of the data at the substantially higher carrier frequency without employing separate devices for encoding and upmixing by modulating the phase of the output according to the logic state of data in a data stream.

Figure 2:
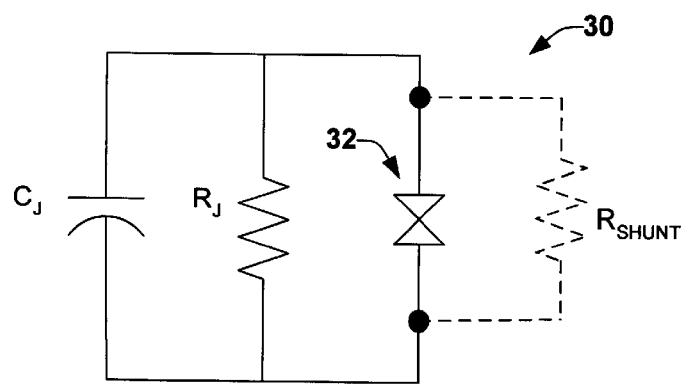
FIG. 2 illustrates an equivalent circuit of a Josephson junction in accordance with an aspect of the present invention.

The output interface 10 includes a RSFQ variable phase dual-junction voltage controlled oscillator (VCO) 11 coupled to a multiplexer 24. The variable phase dual-junction VCO 11 combines the clock function and the phase delay into a single device. The variable phase dual-junction VCO 11 includes a Super Conducting Quantum Interface Device (SQUID) quantizer or super conducting loop 12 comprised of a first inductor $L_1$, a second inductor $L_2$ and two Josephson junctions 14 and 16 in a symmetrically arranged loop. The Josephson junctions 14 and 16 each have an equivalent circuit 30 illustrated in FIG. 2, with a junction resistance $R_j$, a junction capacitance $C_j$ connected in parallel with an ideal Josephson junction 32. An optional shunt resistor $R_{SHUNT}$ can be placed in parallel with the Josephson junction 32 to mitigate frequency fluctuations.

Referring back to FIG. 1, a DC bias current source 18 provides a bias current $I_{FREQ}$ that is applied at a center tap or center terminal of the first and second inductors $L_1$, and $L_2$. The DC-bias current signal $I_{FREQ}$ divides between the inductors and provides a first current $I_1$ that flows through the first inductor $L_1$ and a second current $I_2$ that flows through the second inductor $L_2$. The first current $I_1$ then flows through the first Josephson junction 14 and the second current $I_2$ flows through the second Josephson junction 16. The first current $I_1$ and the second current $I_2$ are substantially equal, and above the critical current of the first Josephson junction 14 and the second Josephson junction 16. In response to the first current $I_1$ and the second current $i_2$, the Josephson junction 14 and the second Josephson junction 16 begin to generate a series of SFQ pulses 14 having a pulse frequency that is proportional to time-averaged DC voltage across the Josephson junctions in response to the current $I_{FREQ}$ provided by the current source 18.

A third inductor $L_3$ and a fourth inductor $L_4$ are magnetically coupled to the first inductor $L_1$ and the second conductor $L_2$, respectively. A flux bias current source 22 is electrically coupled to the third inductor $L_3$ and the fourth inductor $L_4$, and the fourth inductor $L_4$ is electrically coupled to the third inductor $L_3$ and ground. The flux bias current source 22 provides a flux bias current $I_{PHASE}$ that flows through the third inductor $L_3$ and the fourth inductor $L_4$. The third inductor $L_3$ and the fourth inductor $L_4$ form the primary windings of a transformer 20, and the first inductor $L_1$ and the second inductor $L_2$ form the secondary windings of the transformer 20. It is to be appreciated that the primary windings of the transformer can be formed of a single inductor or coil and the secondary windings of the transformer can be formed of a single inductor or coil with the DC bias current source coupled to a center tap of the single inductor of the secondary windings. The current $I_{PHASE}$ that flows through third inductor $L_3$ and the fourth inductor $L_4$ induces a circulating current $I_c$ through the first inductor $L_1$ and second inductor $L_2$. The circulating current $I_c$ flows through the SQUID 12 in a counterclockwise direction along arrows 27. The circulating current $I_c$ is added to the current $I_1$ and produces a current $I_1+I_c$ through the first Josephson junction 14, and the circulating current $I_c$ is subtracted from the current $I_2$ to produce a current $I_2-I_c$ in the second Josephson junction 16. The difference between the currents $I_1+I_c$ and $I_2-I_c$ result in a phase difference between the SFQ pulses generated by the first Josephson junction 14 and the second Josephson junction 16. The flux bias current $I_{PHASE}$ controls the amount of delay between the SFQ pulses generated by the first Josephson junction 14 and the second Josephson junction 16.

The SFQ pulses of the first Josephson junction 14 is provided at a first output terminal 26 and the SFQ pulses of the second Josephson junction 16 is provided at a second output terminal 28 to provide two outputs of a VCO clock. The first output terminal 26 of the VCO clock is coupled to a first input (A) of the multiplexer 24 and the second output terminal 28 is coupled to the second input (B) of the multiplexer 24. The flux bias current $I_{PHASE}$ controls the amount of delay between the A and B clocks. An input data stream is provided at the select line of the multiplexer 24. The input data stream toggles between logic high and logic low to switch the output between the A-phased clock and the B-phased clock. A data with a logic "1" directs the A-phased clock to the output, while a data with a logic "0" directs the B-phased clock to the output.

In the case where the phase delay is 90° (180°) the output is data encoded as QPSK (BPSK) data. For example, if the clock is 50 GHz (period=20 ps) with a phase shift of 90°, a data with a logic "1" will be a clock waveform, while a data with a logic "0" will be a clock waveform delayed by 5 picoseconds. The multiplexer 24 can be a RSFQ multiplexer, which would easily interface to the variable phase delay VCO 11. However, a variety of different multiplexer devices can be employed to carry out the present invention.

Figure 3:
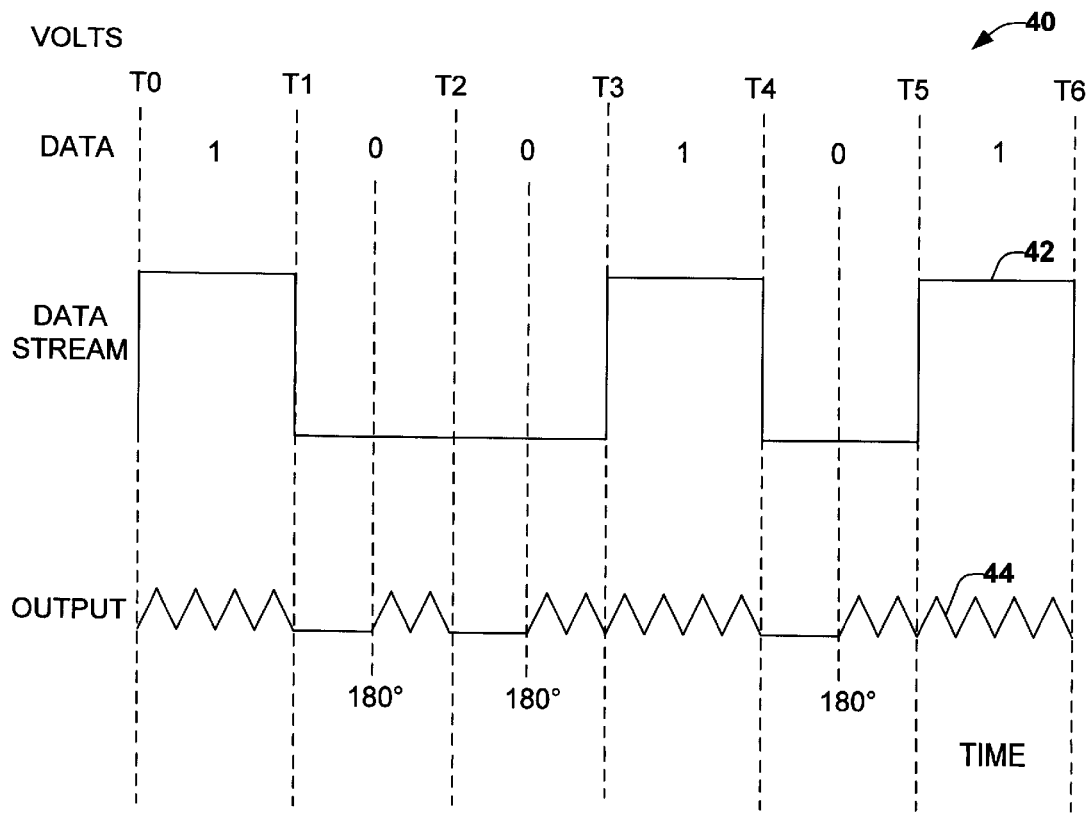
FIG. 3 illustrates a graph of volts versus time of the data stream input and the output of a RSFQ output interface device providing BPSK encoded output data in accordance with an aspect of the present invention.

FIG. 3 illustrates a graph 40 of volts versus time of the data stream input and the output of the RSFQ output interface device 10 providing BPSK encoded output data in accordance with an aspect of the present invention. The graph 40 illustrates a portion of a data waveform 42 and associated data logic state, and a portion of an output waveform 44 over six time periods. During a first time period from time T0 to time T1, the data stream is at a logic "1" and the output signal is in-phase. At a second time period from T1 to time T2, the data stream transitions to a logic "0" and the output waveform is 180° out of phase. At a third time period from T2 to T3, the data stream remains at a logic "0" and the output waveform is 180° out of phase. During a fourth time period from time T3 to time T4, the data stream transitions to a logic "1" and the output signal is in-phase again. At a fifth time period from T4 to time T5, the data stream transitions to a logic "0" and the output waveform is again 180° out of phase. During a sixth time period from time T5 to time T6, the data stream transitions to a logic "1" and the output signal is in-phase again. It is to be appreciated that the phase shift can be varied by changing the flux bias current. For example, the phase shift for a logic "0" can be any of 90°, 180°, 270° out of phase with respect to a logic "1" signal.

Figure 4:
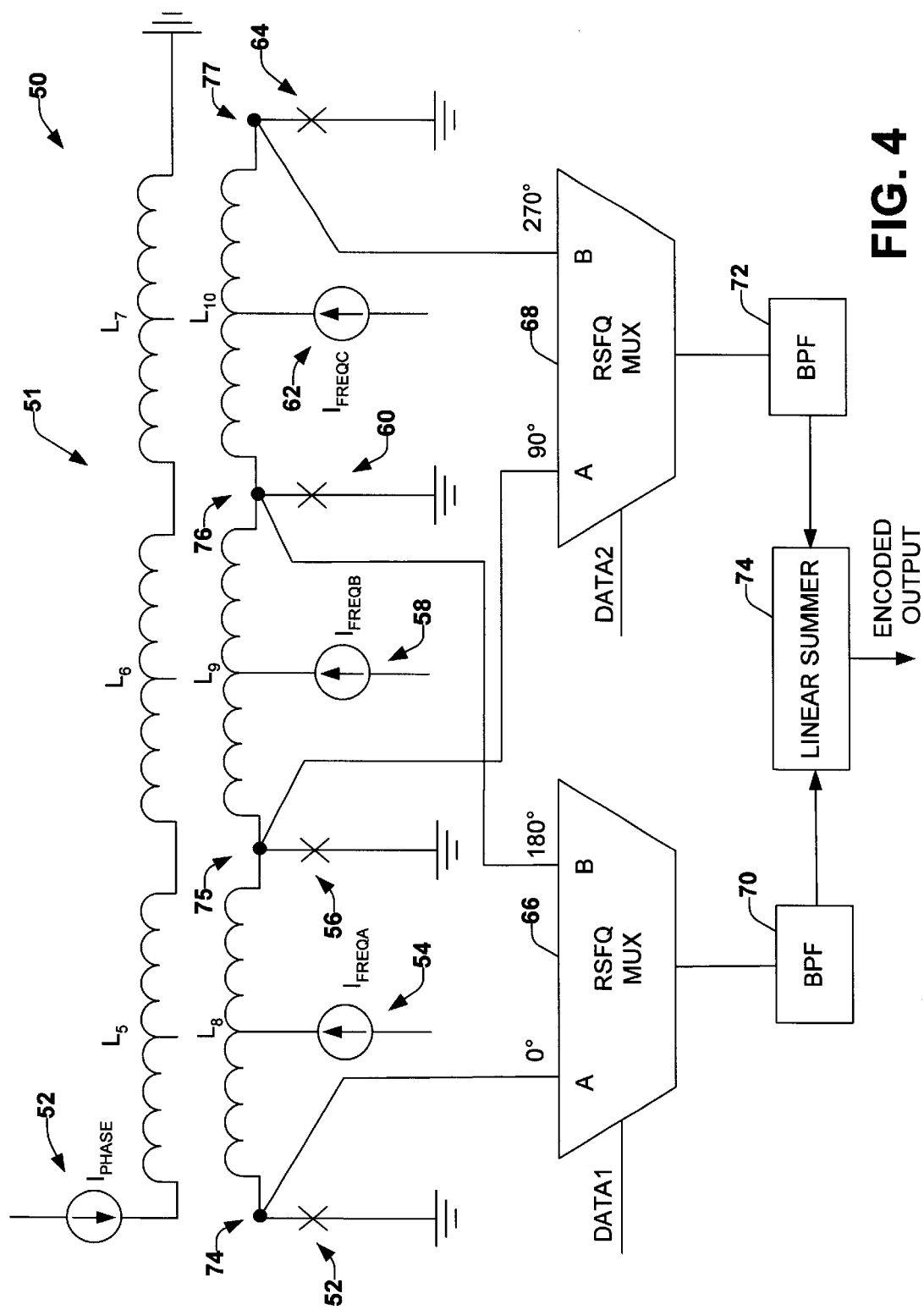
FIG. 4 illustrates a schematic diagram of a high speed quadrature phase shift key (QPSK) RSFQ output interface in accordance with an aspect of the present invention.

FIG. 4 illustrates a schematic diagram of a high speed quadrature phase shift key (QPSK) RSFQ output interface 50 in accordance with an aspect of the present invention. The output interface 50 receives two data streams or a single data stream partitioned into two parts. The data streams are input to the output interface 50 at a first frequency, and an encoded version of the data in QPSK coding is provided as encoded output at a substantially higher carrier frequency. The output interface 50 provides the encoded version of the data at the substantially higher carrier frequency employing a RSFQ variable phase multi-junction VCO 51 coupled to a pair of RSFQ multiplexers 66 and 68. The outputs of the multiplexers 66 and 68 are then input into respective band pass filters 70 and 72 and mixed together via a linear summer 74 to provide an encoded output.

The RSFQ variable delay multi-junction VCO 51 includes a first SQUID quantizer adjacent a second SQUID quantizer and a third SQUID quantizer, adjacent the second SQUID quantizer, each having a respective inductor and a pair of Josephson junctions arranged in a symmetrical loop. The first SQUID quantizer includes an inductor $L_8$ coupled between a first Josephson junction 52 and a second Josephson junction 56. A first output terminal 74 is connected to an "A" input of a first RSFQ multiplexer 66 and a second output terminal 75 is connected to an "A" input of the second RSFQ multiplexer 68. The second SQUID quantizer includes an inductor $L_9$ coupled between the second Josephson junction 56 and a third Josephson junction 60, such that the second output terminal 75 and the second Josephson junction 56 are shared between the first SQUID quantizer and the second SQUID quantizer. A third output terminal 76 is connected to a "B" input of the first RSFQ multiplexer 66. The third SQUID quantizer includes an inductor $L_{10}$ coupled between the third Josephson junction 60 and a fourth Josephson junction 64, such that the third output terminal 76 and the third Josephson junction 60 are shared between the second SQUID quantizer and the third SQUID quantizer. A fourth output terminal 77 is connected to a "B" input of the second RSFQ multiplexer 68. A first DC bias current source 54 provides a bias current $I_{FREQA}$ that is applied at a center tap or center terminal of the inductor $L_8$. A second DC bias current source 58 provides a DC bias current $I_{FREQB}$ to the inductor $L_9$, and a third DC bias current source 62 provides a DC bias current $I_{FREQC}$ to the inductor $L_{10}$. The DC bias current sources are selected to provide an output signal that oscillates at the first output terminal 74, the second output terminal 75, the third output terminal 76 and the fourth output terminal 77 at the same desired output carrier frequency.

A set of inductors $L_5$, $L_6$ and $L_7$ are electrically coupled in series between a flux bias current source 52 and ground. The inductor $L_5$ is electrically coupled to the flux bias current source 52 and magnetically coupled to the inductor $L_8$ of the first SQUID quantizer. The inductor $L_6$ is electrically coupled to the inductor $L_5$ and the inductor $L_7$ and magnetically coupled to the inductor $L_9$ of the second SQUID quantizer. The inductor $L_7$ is electrically coupled to the inductor $L_6$ and ground and magnetically coupled to the inductor $L_{10}$ of the third SQUID quantizer The flux bias current source 52 provides a flux bias current IPHASE that flows through the inductors $L_5$, $L_6$ and $L_7$ and induces a circulating current into the inductors $L_8$, $L_9$ and $L_{10}$. The flux bias current $I_{PHASE}$ is set to induce a circulating current into the inductors L8, L9, and L10 that changes a net current into the Josephson junctions 52, 56, 60 and 64 that causes a phase shift of 90° per output stage, such that a clock signal in-phase is produced at the first output terminal 74, a clock signal 90° out of phase is produced at the second output terminal 75, a clock signal 180° out of phase is produced at the third output terminal 76 and a clock signal 270° out of phase is produced at the fourth output terminal 77.

A first input data stream (DATA1) is provided to a select line of the first RSFQ multiplexer 66, and a second input data stream (DATA2) is provided to a select line of the second RSFQ multiplexer 68. The first and second input data streams toggle between logic high and logic low to switch the outputs between the A-phased clock and the B-phased clock. A data with a logic "1" directs the A-phased clock to the output, while a data with a logic "0" directs the B-phased clock to the output. The first input data stream is encoded and provided at the output of the multiplexer 66. The first encoded data stream is then provided to a narrow bandpass filter 70 to extract out the fundamental frequency of the clock (e.g., to make it sinusoidal). The second encoded data stream is provided to a narrow bandpass filter 72 to extract out the fundamental frequency of the clock (e.g., to make it sinusoidal). The outputs of the first narrow band pass filter 70 and the second bandpass filter 72 are provided to a linear summer 74, so that the signals can be summed to provide the proper encoded output.

It is to be appreciated that higher orders of PSK can be achieved by adding two more output stages or terminals with associated Josephson junctions and one additional multiplexer for each pair of output stages, such that the phase shift per output stage would be 360°/M # of stages where M is an integer and a power of two (e.g., 4, 8, 16, 32, etc.). For example, for four data streams (8PSK), there would be eight output stages and four multiplexers with a 45° phase shift per output stage. The clock streams of opposing phases would be multiplexed together. For example, 0° and 180° would be multiplexed together, 45° and 225° would be multiplexed together, 90° and 270° would be multiplexed together and 135° and 315° would be multiplexed together. The outputs of the multiplexers then would be summed together to provide the encoded output.

Figure 5:
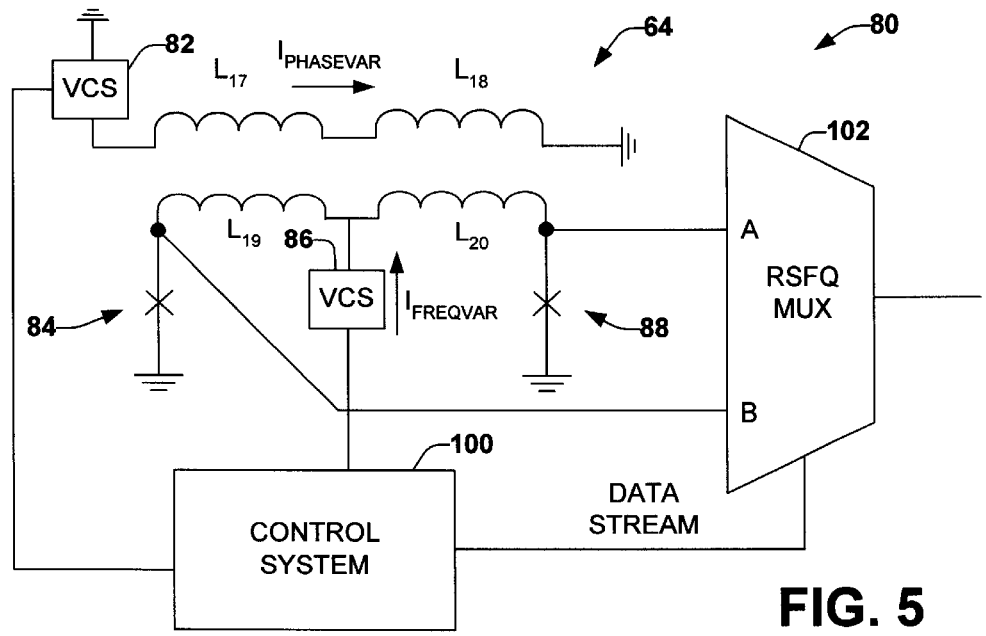
FIG. 5 illustrates a schematic block diagram of a variable encoding system in accordance with an aspect of the present invention.

It is to be appreciated that the present invention can employ a variety of different phase shift encoding schemes and frequency shifted outputs based on the settings of the DC bias current source and the flux bias current source. Additionally, a variable encoding scheme can be provided by employing variable current sources. FIG. 5 illustrates an encoding system 80 for providing a variable encoding scheme in accordance with an aspect of the present invention. The encoding system 80 includes a variable phase dual-junction VCO device 64, a RSFQ multiplexer 102 and a control system 100 that is operative to control a phase flux variable current source 82 and a DC bias variable current source 86. The control system 100 can be a processor or controller having memory to execute an encoding scheme profile that varies the current provided by the flux bias variable current source 82 and the DC bias variable current source 86 discretely over time or continuously over time. For example, the encoding scheme can be varied over discrete time intervals such that at a specific time, the encoding scheme switches over to a new encoding scheme based on environmental changes, security changes, communication parameter changes or other reasons. Alternatively, the encoding scheme can be varied continuously over time to provide a variable encoded output based on an encoding scheme profile. The device receiving the variable encoded output can have the same encoding/decoding scheme profile to decode the variable encoded output.

The encoding system 80 includes the RSFQ variable phase dual-junction VCO 64 coupled to the RSFQ multiplexer 102. The RSFQ variable phase dual-junction VCO 64 includes a SQUID quantizer, which comprises a first inductor $L_{19}$, a second inductor $L_{20}$ and two Josephson junctions 84 and 88 in a symmetrically arranged loop. The DC bias variable current source 86 provides a bias current $I_{FREQVAR}$ that is applied at a center tap or center terminal of the first and second inductors $L_{19}$ and $L_{20}$. The amount of bias current provided by the DC bias variable current source 86 is selected by the control system 100. In response to the bias current $I_{FREQVAR}$, the Josephson junction 84 and the Josephson junction 88 begin to generate a series of SFQ pulses having a pulse frequency that is directly proportional to the current $I_{FREQVAR}$ provided by the variable current source 86.

A third inductor $L_{17}$ and a fourth inductor $L_{18}$ are magnetically coupled to the first inductor $L_{19}$ and the second conductor $L_{20}$, respectively. The phase flux variable current source 82 is coupled to the third inductor $L_{17}$ and the fourth inductor $L_{18}$ and provides a flux bias current $I_{PHASEVAR}$ that flows through the third inductor $L_{17}$ and the fourth inductor $L_{18}$. The amount of flux bias current $I_{PHASEVAR}$ provided by the flux variable current source 82 is selected by the control system 100. The current $I_{PHASEVAR}$ that flows through third inductor $L_{17}$ and the fourth inductor $L_{18}$ induces a circulating current through the first inductor $L_{19}$ and second inductor $L_{20}$. The circulating current flows through the SQUID in a counterclockwise direction resulting in a phase difference between the SFQ pulses generated by the Josephson junction 84 and the Josephson junction 88. The flux bias current $I_{PHASEVAR}$ controls the amount of delay between the SFQ pulses generated by the Josephson junction 84 and the Josephson junction 88.

The SFQ pulses of the Josephson junction 84 is provided at a first input (A) of the multiplexer 102 and the SFQ pulses of the Josephson junction 88 is provided at the second input (B) of the multiplexer 102. The flux bias current $I_{PHASEVAR}$ controls the amount of delay between the A and B clocks, and the DC bias current $I_{FREQVAR}$ controls the frequency of the clocks A and B. An input data stream is provided by the control system 100 at the select line of the multiplexer 102. The input data stream toggles between logic high and logic low to switch the output between the A clock and the B clock. The encoded output of the multiplexer 102 can be varied in phase shifts and/or frequency shifts over different time periods or intervals in a discrete or continuous manner.

Figure 6:
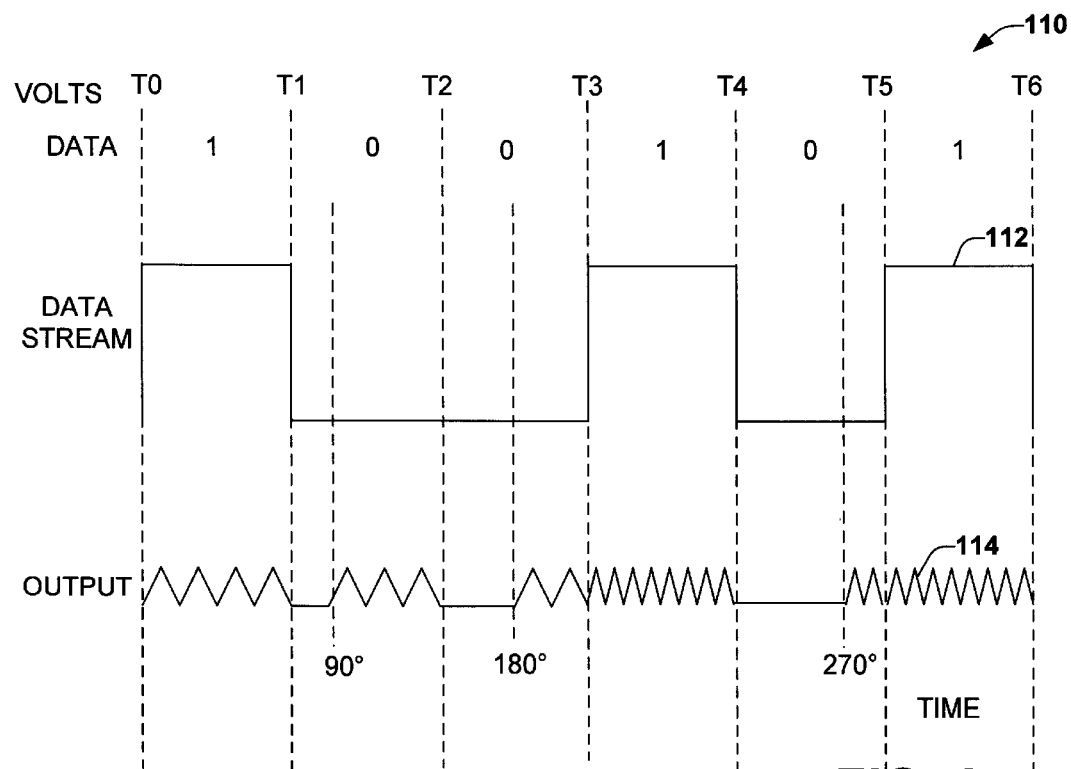
FIG. 6 illustrates a graph of volts versus time of an exemplary data stream input and the output of the encoder system of FIG. 5 in accordance with an aspect of the present invention.

FIG. 6 illustrates a graph 110 of volts versus time of the data stream input and the output of the encoder system in accordance with an aspect of the present invention. The graph 110 illustrates a portion of a data waveform 112 and associated data logic state and a portion of an output waveform 114 over six time periods. During a first time period from time T0 to time T1, the data stream is at a logic "1" and the output signal is in-phase at a first frequency. At a second time period from T1 to time T2, the data stream transitions to a logic "0" and the output waveform is 90° out of phase at the first frequency. At a third time period from T2 to T3, the data stream remains at a logic "0", but the output waveform is 180° out of phase at the first frequency. During a fourth time period from time T3 to time T4, the data stream transitions to a logic "1" and the output signal is in-phase again, but at a second frequency. At a fifth time period from T4 to time T5, the data stream transitions to a logic "0" and the output waveform is 270° out of phase at the second frequency. During a sixth time period from time T5 to time T6, the data stream transitions to a logic "1" and the output signal is in-phase again at the second frequency. It is to be appreciated that variations in phase shifts and frequencies can provide a variety of different encoding schemes by controlling the flux bias current $I_{PHASEVAR}$ and the DC bias current $I_{FREQVAR}$ over different time periods and intervals in a discrete or continuous manner.

Figure 7:
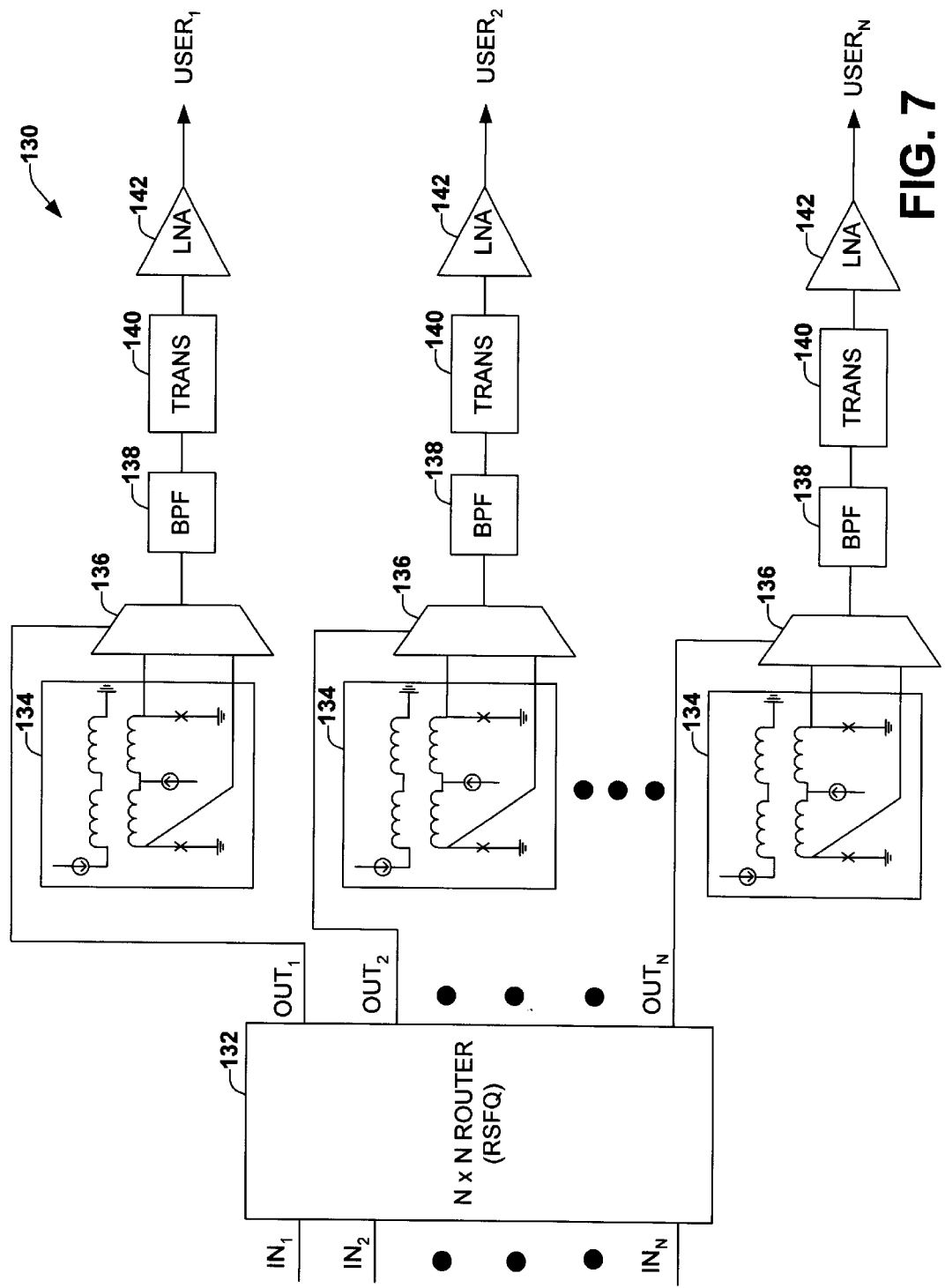
FIG. 7 illustrates a schematic block diagram of a network router system in accordance with an aspect of the present invention.

FIG. 7 illustrates one particular implementation employing the RSFQ encoder output interface device in accordance with an aspect of the present invention. A network router system 130 is provided with an N×R router device 132 and a plurality of RSFQ encoder output interface devices. The N×R router device includes a plurality of input terminals labeled input $IN_1$ to $IN_N$. The plurality of input terminals receive input streams from a plurality of devices, for example, over a wired network. The N×R router device 132 extracts routing information from the input streams and routes the data to a plurality of output terminals labeled $OUT_1$ to $OUT_R$ based on the extracted routing information. The number of inputs N can be equal or not equal to the number of outputs R. The N×R router device 132 is a RSFQ device similar to the RSFQ encoder output interface devices.

The output terminals provide data streams to respective RSFQ output encoder interface devices. Each RSFQ encoder output interface device includes a variable phase two-terminal VCO clock 134 coupled to a two input terminal RSFQ multiplexer device 136. One of the variable phase two-terminal VCO clock terminals is provided to a first input terminal of the RSFQ multiplexer device 136 with the other of the variable phase two-terminal VCO clock terminals provided to a second input terminal of the RSFQ multiplexer device 136. The data stream of the output terminal of the N×R router device 132 is coupled to the select line of the respective multiplexer 136. The variable phase two-terminal VCO clock provides two phase shifted clock signals and the logic state of the data stream determines which of the clock signals is provided at the output of the multiplexer 136. An optional narrow band pass filter 138 receives the output signal from the multiplexer 136 to extract the fundamental frequency from the output signal. The output signal is then provided to a transformer 140.

The transformer 140 converts the output signal voltage to a signal level appropriate for transmission over a wire. The transformer can be a microstrip device which matches the impedance of the RSFQ multiplexer 136 (e.g., about 4 ohms to about 50 ohms). The encoded data can be amplified by an AC-coupled amplifier to avoid 1/f noise and the microstrip transformer employed to provide passive gain. The converted output signal is then provided to a low noise amplifier 142 to mitigate noise introduce into the converted output signal. The low noise amplifier 142 can be, for example, a high-electron mobility transistor (HEMT) amplifier. The encoded frequency shifted output signal is then provided across respective transmission lines to respective users labeled $USER_1$ through $USER_R$. The gain of the transformer can be proportional to the square root of the impedance ratio (e.g., about 3.5) between the superconducting circuitry (e.g., about 4 ohms) and a user interface board (e.g., about 50 ohms).

Figure 8:
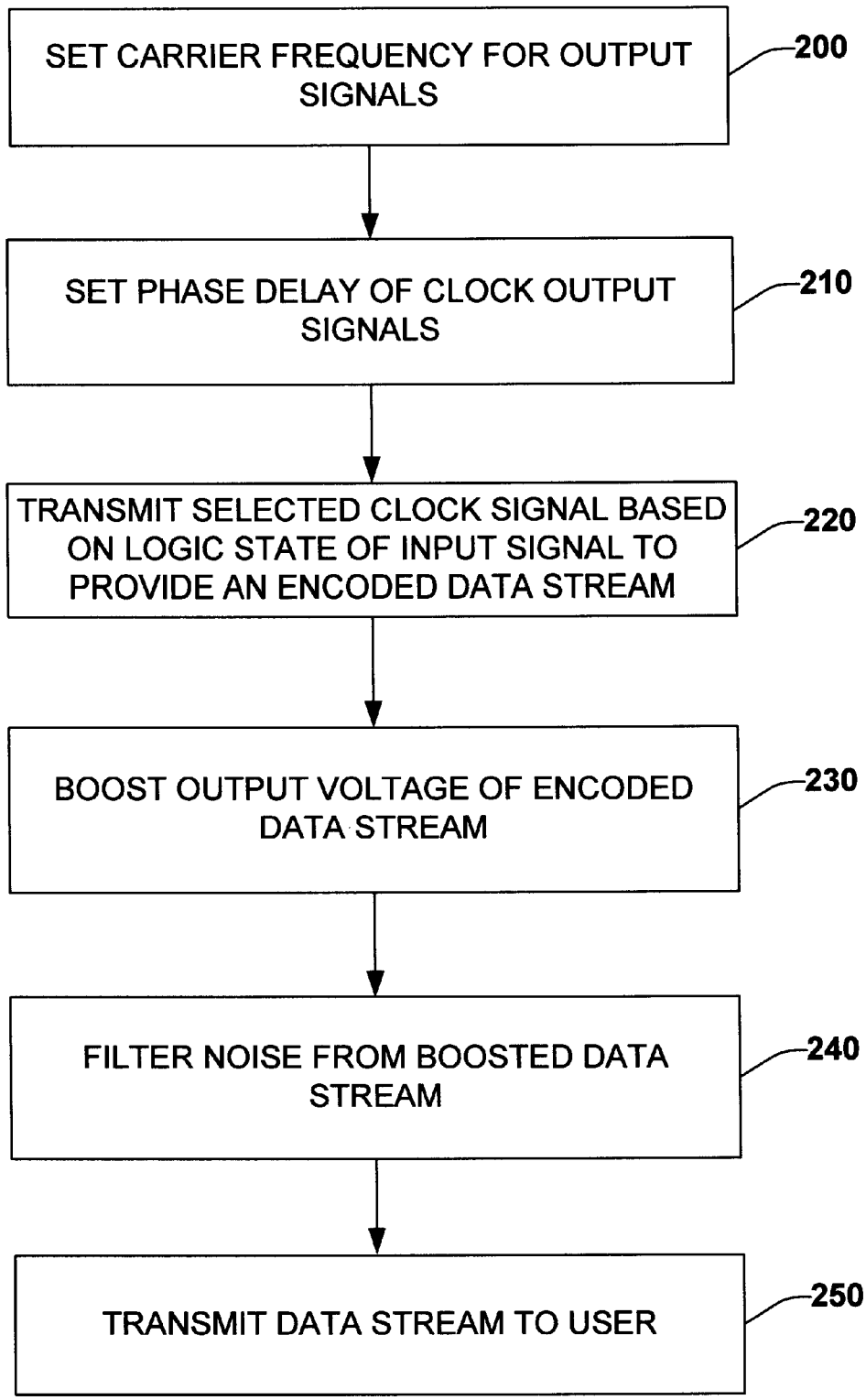
FIG. 8 illustrates a methodology for transmitting data in a BPSK encoded format employing a RSFQ variable phase dual-junction voltage controlled oscillator (VCO) in accordance with an aspect of the present invention.
Figure 9:
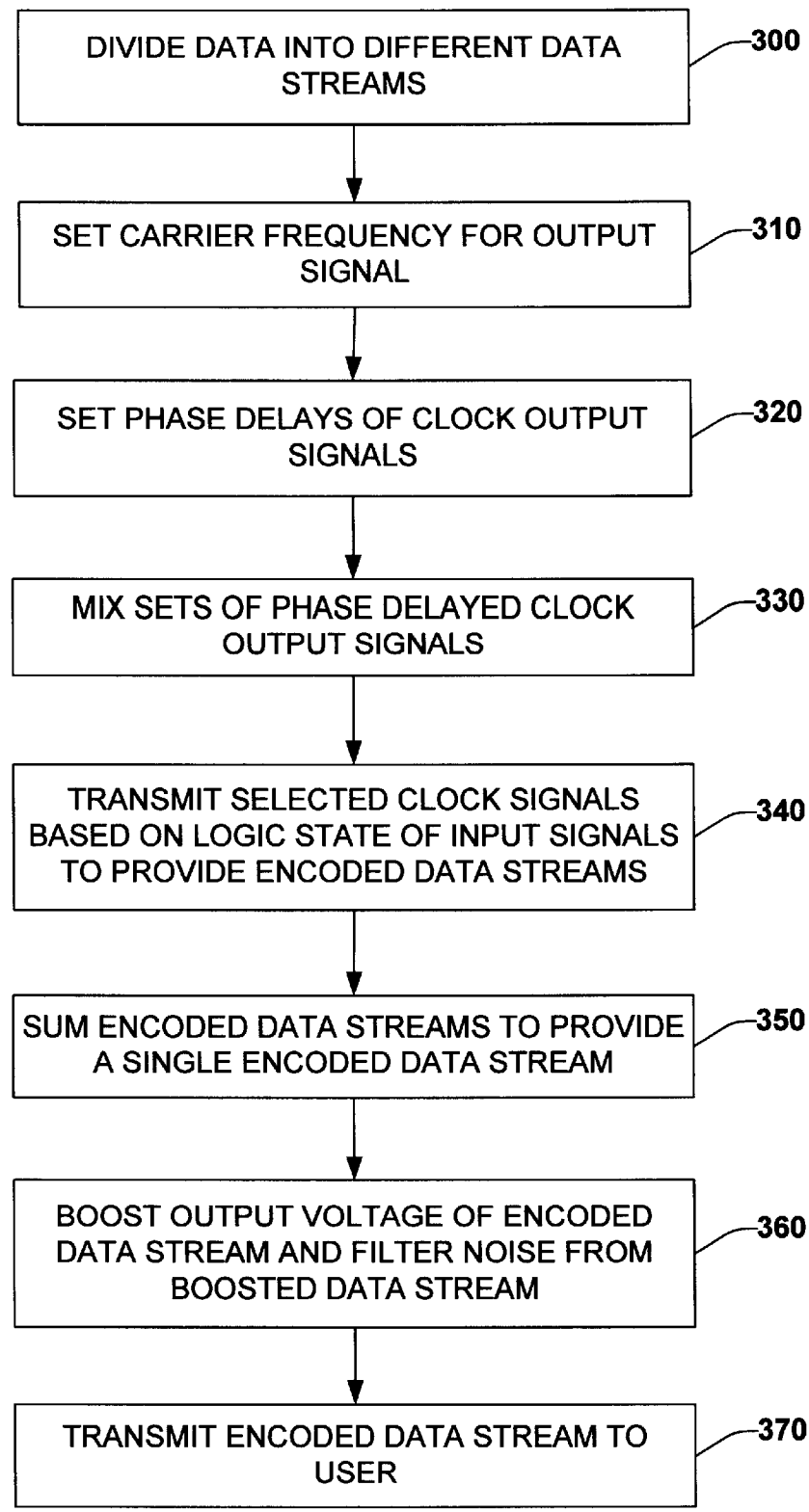
FIG. 9 illustrates a methodology for transmitting data in a MPSK encoded format employing a RSFQ variable phase multi-junction VCO in accordance with an aspect of the present invention.
Figure 10:
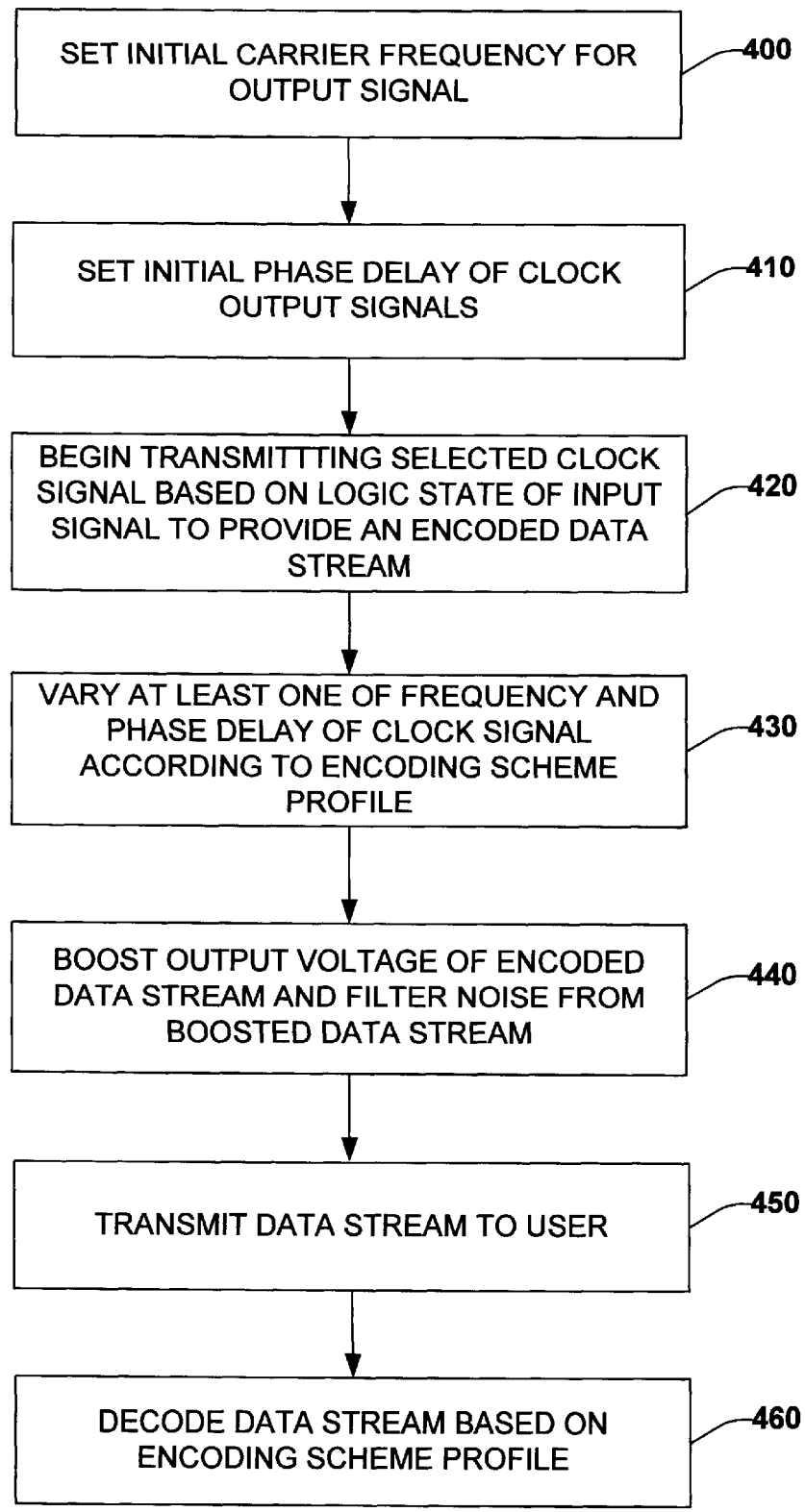
FIG. 10 illustrates a methodology for transmitting data in a variable encoded format employing a RSFQ variable phase dual-junction VCO in accordance with an aspect of the present invention.

In view of the foregoing structural and functional features described above, a methodology in accordance with various aspects of the present invention will be better appreciated with reference to FIGS. 8–10. While, for purposes of simplicity of explanation, the methodologies of FIGS. 8–10 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 8 illustrates a methodology for transmitting data in a BPSK encoded format employing a RSFQ variable phase dual-junction VCO in accordance with an aspect of the present invention. The methodology begins at 200 where the carrier frequency for the clock output signals are set. The carrier frequency is set by setting the current of a DC bias current source in a SQUID quantizer or super conducting loop of the RSFQ variable phase dual-junction VCO. The SQUID quantizer includes an inductor coupled between two Josephson junctions. At 210, the phase delay of the clock output signals are set by setting the current of a flux bias current source to one or more inductors magnetically coupled to one or more associated inductors in the SQUID quantizer. This results in two clock output signals generated by the two Josephson junctions having a frequency based on the current of the DC bias current source and having a phase shift from one another based on the current of the flux bias current source.

At 220, the selected clock output signal is transmitted based on the logic state of the input data stream to provide an encoded data stream. The output voltage of the encoded data stream is converted to prepare the signal for transmission over a wire, for example, by employing a transformer. The transformer converts the SFQ clock output signals of about 0.5 to about 2 millivolts (mV) to a voltage appropriate for transmitting over a wire. At 240, the converted encoded data stream is filtered to eliminate noise associated with the converted encoded data stream. At 250, the encoded converted data stream is transmitted to a user over a wired network or the like.

FIG. 9 illustrates a methodology for transmitting data in a MPSK encoded format employing a RSFQ variable phase multi-terminal VCO in accordance with an aspect of the present invention. M is an integer and a power of 2 (e.g., 4, 8, 16, 32, etc.) such that the RSFQ variable phase multi-terminal VCO includes M−1 SQUID quantizers having associated DC bias current sources and inductors, M−1 magnetically coupled flux bias inductors with an associated flux bias current source, M Josephson junctions or output stages having associated output terminals with the outputs being separated in phase by 360°/M and M/2 two-to-one multiplexers. The methodology begins at 300 where the data is divided into different data streams. At 310, the carrier frequency for the output signals are set. The carrier frequency is set by setting the currents of DC bias current sources associated with the M−1 SQUID quantizers or super conducting loops to provide similar frequency outputs at each of the M stages.

At 320, the phase delay of the clock output signals are set by setting the flux bias current of the flux bias current source to induce a circulating current into the SQUID quantizers. This results in M stages of clock output signals having a frequency based on the current of the DC bias current sources and having a phase shift from one another based on the current of the flux bias current source. The flux bias current is set so that the output stages provide a phase shift that is 360°/M apart from one another. At 330, sets of phase delayed clock signals are mixed together employing separate multiplexers. The clock signals that are 180° (opposing phases) apart can be mixed together in corresponding two-to-one multiplexers. For example, if M is 4, the 0° and 180° clock output signals are mixed together and the 90° and 270° clock output signals are mixed together in associated multiplexers. If M is 8, the 0° and 180° clock output signals are mixed together, the 45° and 225° clock output signals are mixed together, the 90° and 270° clock output signals are mixed together and the 135° and 315° clock output signals are mixed together in associated multiplexers.

At 340, the selected clock output signals of the respective multiplexers are transmitted based on the logic state of the input signals to provide encoded data streams. At 350, the encoded data streams are summed together to provide a single encoded data stream. At 360, the output voltage of the encoded data stream is converted to prepare the signal for transmission over a wire, for example, by employing a transformer, and the converted encoded data stream is filtered to eliminate noise associated with the converted encoded data stream. At 370, the encoded converted data stream is transmitted to a user over a wired network or the like.

FIG. 10 illustrates a methodology for transmitting data in a variable encoded format employing a RSFQ variable phase dual-junction VCO in accordance with an aspect of the present invention. The methodology begins at 400 where the initial carrier frequency for the clock output signals are set. The carrier frequency is set by setting the current of a DC bias current source in a SQUID quantizer or super conducting loop of the RSFQ variable phase dual-junction VCO. The SQUID quantizer includes an inductor and two Josephson junctions. At 410, the phase delay of the clock output signals are set by setting the current of a flux bias current source to one or more inductors magnetically coupled to one or more associated inductors in the SQUID quantizer. This results in two clock output signals generated by the Josephson junctions having a frequency based on the current of the DC bias current source and having a phase shift from one another based on the current of the flux bias current source.

At 420, transmission of the selected clock signal begins based on the logic state of the input signal to provide an encoded data stream. At 430, at least one of the frequency and phase delay of the clock signals are varied according to an encoding scheme profile. At 440, the output voltage of the encoded data stream is converted to prepare the signal for transmission over a wire, for example, by employing a transformer and the converted encoded data stream is filtered to eliminate noise associated with the converted encoded data stream. At 450, the encoded converted data stream is transmitted to a user over a wired network or the like. At 460, the data stream is decoded based on the encoding scheme profile.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A Rapid Single-Flux-Quantum (RSFQ) encoder output interface device comprising:
   a RSFQ variable phase multi-junction voltage controlled oscillator (VCO) that provides a plurality of phase shifted clock output signals with substantially equal frequencies; and
   a mixing device that mixes the plurality of phase shifted clock output signals together based on logic states of a data stream to provide an encoded output data stream.

2. The device of claim 1, the RSFQ variable phase multi-junction VCO comprises a Superconducting Quantum Interface Device (SQUID) quantizer having at least one inductor coupled between a pair of Josephson junctions and a DC bias current source coupled to a center terminal of the at least one inductor, the DC bias current source provides a DC bias current such that substantially equal currents flow through the pair of Josephson junctions causing the pair of Josephson junctions to oscillate and generate a series of Single-Flux-Quantum (SFQ) voltage pulses of substantially equal frequencies.

3. The device of claim 2, the RSFQ variable phase multi-junction VCO further comprises a flux bias current source coupled to at least one flux bias inductor that is magnetically coupled to the at least one inductor of the SQUID quantizer, the flux bias current flowing through the at least one flux bias inductor induces a circulating current through the SQUID quantizer that causes a phase shift between the series of SFQ voltage pulses generated by the pair of Josephson junctions.

4. The device of claim 3, the flux bias current source being a variable current source such that the encoded output data stream has a variable phase encoded format.

5. The device of claim 2, the DC bias current source being a variable current source such that the encoded output data stream has a variable frequency encoded format.

6. The device of claim 1, the encoded output stream being in a Phase-Shift-Keying (PSK) coding format.

7. The device of claim 6, the PSK coding format being one of binary PSK (BPSK) and quadrature PSK (QPSK) coding format.

8. The device of claim 1, the encoded output stream having a variable encoded format that varies in at least one of phase and frequency according to an encoded scheme profile.

9. The device of claim 1, the mixing device being at least one multiplexer that receives the plurality of phase shifted clock output signals as inputs and mixes the plurality of phase shifted clock output signals based on logic states of the data stream provided at a select line of the at least one multiplexer to provide the encoded output data stream.

10. The device of claim 9, the at least one multiplexer being an RSFQ multiplexer device.

11. A network routing system comprising the Rapid Single-Flux-Quantum (RSFQ) encoder output interface device of claim 1.

12. The network routing system of claim 11, further comprising an N×R router device where N is the number of inputs and R is the number of outputs, both N and R being integers that are one of equal and not equal to one another, and a plurality of RSFQ encoder output interface devices associated with each output to transmit data to r users, each user associated with a respective output.

13. The network routing system of claim 12, further comprising a transformer coupled to each output of the plurality of RSFQ encoder output interface devices and a low noise amplifier coupled to each transformer, the transformer converting the voltage of the encoded output stream and the low noise amplifier mitigating noise associated with the voltage converting.

14. A Phase-Shift-Keying (PSK) coding Rapid Single-Flux-Quantum (RSFQ) output interface device comprising:
a RSFQ variable phase multi-junction voltage controlled oscillator (VCO) comprising:
M−1 adjacent Super Conducting Quantum Interface Device (SQUID) quantizers where M is the number of output terminals of the RSFQ variable phase multi-junction VCO, the SQUID quantizers having at least one inductor coupled between a pair of associated Josephson junctions with adjacent SQUID quantizers sharing adjacent Josephson junctions and each of the SQUID quantizers having an associated DC bias current source coupled to a center terminal of the at least one inductor, the DC bias current sources provide DC bias currents such that each of the Josephson junctions oscillate and generate a series of Single-Flux-Quantum (SFQ) voltage pulses of substantially equal frequencies at associated output terminals; and
a flux bias current source electrically coupled a plurality of flux bias inductors that are magnetically coupled to the at least inductor of the SQUID quantizers, the flux bias current flowing through the plurality of flux bias inductors induces circulating currents through the SQUID quantizers that causes phase shifts between the series of SFQ voltage pulses generated at associated output terminals, the phase shifts being equal to 360°/M where M is an integer and a power of 2;
M/2 multiplexers that receive the phase shifted SFQ voltage pulses where each multiplexer receives a first and a second phase shifted SFQ voltage pulse of opposing phases; and
a summer that sums the outputs of the multiplexers to provide a single encoded output having a M Phase-Shift-Keying (PSK) coding format.

15. The device of claim 14, M being 2 such that the output is encoded in binary PSK (BPSK) coded format.

16. The device of claim 14, M being 4 such that the output is encoded in quadrature PSK (QPSK) coded format.

17. The device of claim 14, M being 8 such that the output is encoded in an eight PSK coded format.

18. A Rapid Single-Flux-Quantum (RSFQ) encoder output interface device comprising:
a RSFQ dual-junction voltage controlled oscillator (VCO) having a first output junction and a second output junction;
means for generating a first clock output signal at the first output junction;
means for generating second clock output signal at the second output junction;
means for controlling the frequency of the first clock output signal and the second clock output signal;
means for shifting the phase of the second clock output signal with respect to the first clock output signal; and
means for mixing the first clock output signal and the second clock output signal based on logic states of a data stream to provide an encoded output data stream.

19. The device of claim 18, the means for controlling comprising a variable DC bias current source.

20. The device of claim 18, the means for shifting comprising a variable flux bias current source.

21. A method for transmitting data in an encoded format employing a Rapid Single-Flux-Quantum (RSFQ) variable phase multi-junction voltage controlled oscillator (VCO) the method comprising:
setting a carrier signal frequency for a plurality of Single-Flux-Quantum (SFQ) voltage pulse clock output signals;
setting a phase delay for the SFQ voltage pulse clock output signals;
transmitting selected SFQ voltage pulse clock output signals based on logic states of an input data stream to provide an SFQ encoded data stream;
converting the output voltage of the SFQ encoded data stream; and
transmitting the converted encoded data stream.

22. The method of claim 21, further comprising filtering noise from the converted output voltage of the SFQ encoded data stream.

23. The method of claim 21, further comprising varying at least one of the carrier signal frequency and phase delay to provide a variable encoded format.

24. The method of claim 21, further comprising mixing sets of phase delayed SFQ voltage pulse clock output signals to provide a plurality of encoded streams, the mixing sets having opposing phases, and summing the plurality of encoded streams to provide a single encoded data stream.

25. The method of claim 21, the SFQ encoded data stream being in a Phase-Shift-Keying (PSK) coding format.

* * * * *